United States Patent Office 3,729,513
Patented Apr. 24, 1973

3,729,513
TRICYCLO[4.3.1.1³,⁸]UNDECANE-4-ONE
Gilbert H. Berezin, West Chester, Pa., assignor to E. I. du Pont de Nemours and Company, Wilmington, Del.
No Drawing. Application July 31, 1969, Ser. No. 846,620, which is a continuation-in-part of application Ser. No. 758,631, Sept. 9, 1968. Divided and this application Feb. 9, 1971, Ser. No. 114,086
Int. Cl. C07c *49/26*
U.S. Cl. 260—586 A     1 Claim

ABSTRACT OF THE DISCLOSURE

Tricyclo[4.3.1.1$^{3,8}$]undecane - 4 - one, useful as an intermediate in the preparation of anti-viral 4-amino- and 4-aminomethyl-tricyclo[4.3.1.1$^{3,8}$]undecanes, is prepared from 2-aminomethyl - 2 - adamantanol. The latter compound is prepared from methylene adamantane or adamantanone.

CROSS-REFERENCE TO RELATED APPLICATIONS

This application is a division of my application Ser. No. 846,620, filed July 31, 1969, which is in turn a continuation-in-part of my application Ser. No. 758,631, filed Sept. 9, 1968, both now abandoned.

BACKGROUND OF THE INVENTION

Cairns U.S. Pat. 3,397,233, issued Aug. 13, 1968, discloses a class of 3-amino-tricyclo[4.3.1.1$^{3,8}$]undecanes useful as anti-viral agents. In these compounds an amino or substituted amino group is attached to a 3-position tertiary or bridgehead nuclear carbon. I have discovered a class of anti-viral 4-amino- and 4-aminomethyl-tricyclo-[4.3.1.1$^{3,8}$]undecanes, in which a substituted or unsubstituted amino or aminomethyl group is attached to a 4-position secondary or non-bridgehead nuclear carbon, and methods for making them. The compound of the present invention is an intermediate in each of these methods.

SUMMARY OF THE INVENTION

This invention is the novel compound, tricyclo-[4.3.1.1$^{3,8}$]undecane-4-one, having the structural formula:

(1)     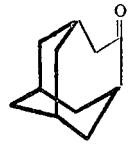

The invention also includes a method of making tricyclo[4.3.1.1$^{3,8}$]undecane-4-one which comprises reacting 2-aminomethyl-2-adamantanol with a source of nitrous acid in an aqueous medium, until the ketone precipitates. in accordance with the following equation:

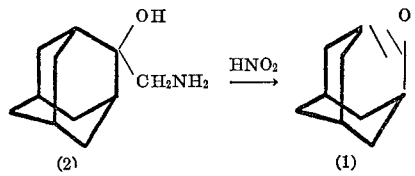

DESCRIPTION OF THE INVENTION

Details of a process for making tricyclo[4.3.1.1$^{3,8}$]undecane-4-one from 2-aminomethyl - 2 - adamantanol are given in Example 4 below. In Example 4 the source of nitrous acid is a mixture of sodium nitrite and glacial acetic acid, but it will be understood that any water soluble nitrite and any suitable acid can be used.

The 2-aminomethyl-2-adamantanol is itself a novel compound, and can be prepared from 2-methylene adamantane or adamantanone by the procedures of Examples 1, 2 and 3 below.

The compound of this invention is useful as an intermediate in the preparation of anti-viral 4-amino- and 4 - aminomethyl - tricyclo[4.3.1.1$^{3,8}$]undecanes of the formula:

(3)   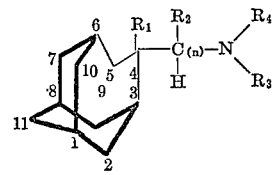

where $n$ is 0 or 1;
$R_1$ is hydrogen or alkyl of one to two carbons;
$R_2$ is hydrogen or alkyl of one to two carbons;
$R_3$ is hydrogen, alkyl of one through four carbon atoms, alkenyl of three through nine carbon atoms, 3-methyl-2-methylene-3-butenyl, cycloalkenyl of five through eight carbon atoms, alkenylcycloalkyl of six through nine carbon atoms, cycloalkyl alkenyl of six through nine carbon atoms, alkynyl of three through five carbon atoms or benzyl;
$R_4$ is hydrogen, alkyl of one through three carbon atoms, alkenyl of three through five carbon atoms or propargyl; provided that $R_3$ and $R_4$ can be joined to form a nitrogen containing heterocyclic ring and with the limitation that when the $R_3$ and/or $R_4$ substituent is unsaturated the double bond or the triple bond is not in the "1" position; and the pharmaceutically acceptable salts of said compounds.

A preferred compound of the above class is the hydrochloride salt of 4-aminomethyl-tricyclo[4.3.1.1$^{3,8}$]undecane. Example 5 below gives a procedure for making the latter compound from the compound of this invention.

Other preferred compounds of the above class are N-benzyl - 4 - aminomethyl - tricyclo[4.3.1.1$^{3,8}$]undecane hydrochloride and N - allyl - 4 - aminomethyl-tricyclo-[4.3.1.1$^{3,8}$]undecane hydrochloride. These compounds are prepared from 4 - aminomethyl - tricyclo[4.3.1.1$^{3,8}$]undecane by conventional procedures for converting primary amines to secondary amines. Example 6 below gives a method of preparing 4-aminomethyl-tricyclo[4.3.1.1$^{3,8}$] undecane from the compound of this invention.

Procedures for making other compounds of Formula 3 are described in parent applications 758,631 and 846,620.

The 4-amino and 4-aminoethyl tricyclo[4.3.1.1$^{3,8}$]undecanes of Formula 3 are particularly useful in controlling upper respiratory virus infections of warm-blooded animals such as influenza, parainfluenza, respiratory syncytial, rhinovirus and the like. The compounds can be administered by any means that effects contact of the active ingredient compound with the site of virus infection in the body of a warm-blooded animal. This includes the site prior to infection setting in as well as after. For example, administration can be parenterally, subcutaneously, intravenously, intramuscularly, or intraperitoneally. Alternatively or concurrently, administration can be by the oral route. The dosage administered will be dependent upon the virus being treated, the age, health and weight of the recipient, the extent of infection, kind of concurrent treatment if any, frequency of treament, and the nature of the effect desired. Generally, a daily dosage of active ingredient compound will be from about 1 to 50 milligrams per kilogram of body weight, although lower, such as 0.5 milligram, per kilogram or higher amounts can be used. Ordinarily, from 1 to 20 and preferably 1 to 10 milligrams per kilogram per day, in one or more applications per day is effective to obtain the desired result.

The compound of Formula 3 can be employed in such dosage forms as tablets, capsules, powder packets, or liquid solutions, suspensions, or elixirs, for oral administration or liquid for parenteral use, and in certain cases, suspensions for parenteral use (except intravenous). In such compositions, the active ingredient will ordinarily always be present in an amount of at least 0.5% by weight based on the total weight of the composition and not more than 90% by weight.

Besides the active ingredient the antiviral composition will contain a solid or liquid non-toxic pharmaceutical carrier for the active ingredient. The solid carrier can be a capsule of the ordinary gelatin type. In the capsule will be from about 30–60% by weight of a compound of Formula 3 and 70–40% of a carrier. The active ingredient can be tableted with or without adjuvants, or put into powder packets. These capsules, tablets and powders will generally constitute from about 5% to about 95% and preferably from 25% to 90% by weight active ingredient. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water saline, aqueous dextrose (glucose) and related sugar solutions and glycols such as propylene glycol or polyethylene glycols are preferred liquid carriers, particularly for injectible solutions. Sterile injectible solutions such as saline will ordinarily contain from about 0.5% to 25% and preferably about 1 to 10% by weight of the active ingredient.

As mentioned above, oral administration can be in a suitable suspension or syrup, in which the active ingredient ordinarily will constitute from about 0.5 to 10% and preferably about 2 to 5%, by weight. The pharmaceutical carrier in such composition can be a watery vehicle such as an aromatic water, a syrup or a pharmaceutical mucilage.

Example 1

To a solution of 0.27 mole 2-methylene adamantane in 1000 ml. of ether is added 0.29 mole of 85% m-chloroperbenzoic acid over a 2-hour period. The reaction is held at $-10°$ C. during the addition. At the end of this period, the reaction is allowed to come to room temperature. Stirring is continued for an additional 16 hours. At the end of this period, the ether solution is transferred to a separatory funnel and extracted with saturated sodium sulfite solution, saturated sodium bicarbonate solution and saturated sodium chloride solution. The ether layer is dried over anhydrous sodium sulfate. The ether is removed at reduced pressure to give 45 g. of crude spiro[oxirane-2,2'-tricyclo(3.3.1.1$^{3,7}$)]decane, a white solid. This is suitable for the next step but can, if desired, be crystallized from pentane at $-70°$ C. to give a purified product, M.P. 164–166° C.

Analysis.—Calcd. for $C_{11}H_{16}O$ (percent): C, 80.40; H, 9.82. Found (percent): C, 79.65; H, 9.8.

To a 1300 ml. stainless steel bomb, there is added 45 g. of spiro[oxirane-2,2'-tricyclo(3.3.1.1$^{3,7}$)]decane 800 ml. of 28% ammonium hydroxide solution and 60 g. of ammonia. The bomb is sealed and the reaction mixture is heated to 120° C. for three hours with shaking. The bomb is cooled and the contents decanted. The aqueous solution containing a tan solid is diluted to 2 liters with water and heated to reflux. The boiling solution is filtered, concentrated to 800 ml. and cooled to 0° C. in an ice bath. The glistening white plates that precipitate are filtered, pressed dry and recrystallized from cyclohexane to give 2-aminomethyl-2-adamantanol.

Example 2

To a well stirred solution of 0.1 mole adamantanone dissolved in 75 ml. of methanol, there is added 0.30 mole of concentrated sulfuric acid at a rate that causes the solution to reflux. To this refluxing solution is added a saturated aqueous solution containing 0.60 mole of sodium cyanide. The resulting solution is heated at reflux for one hour. The solution is stirred for an additional three hours at room temperature. At the end of this period, 200 ml. of ether is added to the solution. The ether solution is decanted from the precipitated salts and extracted with two 50 ml. portions of saturated sodium chloride solution. The ether solution is dried with anhydrous magnesium sulfate. The solution is filtered and the ether is removed at reduced pressure to give a tan solid. The solid is recrystallized from methyl cyclohexane to give adamantane cyanohydrin, M.P. 257–259° C. (decomp).

To a suspension of 0.13 mole lithium aluminum hydride in 200 ml. of ether, is added with vigorous stirring at reflux 0.028 mole of adamantanone cyanohydrin dissolved in 100 ml. of ether. The mixture is heated at reflux for 6 hours and then allowed to cool to room temperature. Stirring is continued overnight. At the end of this period, the mixture is cooled to $-5°$ C. with an ice-acetone bath. To the cooled reaction mixture is added 30% aqueous sodium hydroxide until the salts precipitate. The ether solution is filtered and dried over potassium hydroxide pellets. The ether is filtered and evaporated at reduced pressure to give 2-aminomethyl-2-adamantanol as a white solid. The compound when recrystallized from cyclohexane gives white plates, M.P. 124–126° C.

Analysis.—Calcd. for $C_{11}H_{19}NO$ (percent): C, 74.6; H, 8.50; N, 7.90. Found (percent): C, 74.9; H, 8.47; N, 8.00.

The amine hydrochloride is prepared by dissolving 2-aminomethyl-2-adamantanol in a mixture of 50% tetrahydrofuran and 50% ether. Anhydrous hydrogen chloride gas is then introduced into this solution to precipitate the amine hydrochloride. The white precipitate is recrystallized for methanol-ether to give white plates, M.P.>300° C.

Analysis.—Calcd. for $C_{11}H_{19}NO \cdot HCl$ (percent): C, 60.7; H, 9.2; N, 6.4; Cl, 16.3. Found (percent): C, 61.2; H, 9.6; N, 6.5; Cl, 16.0.

Example 3

To a solution of 0.3 mole of sodium in 200 ml. of ethanol is added a solution of 0.25 mole of adamantanone and 0.32 mole of nitromethane in 15 ml. of ethanol. The solution is held at 45° C. during addition or for approximately five minutes. The solution is allowed to cool to room temperature and is stirred for 16 hours. At the end of that period the solution is cooled to 10° C. and 0.35 mole of glacial acetic acid is added. The reaction mixture is stirred for 20 minutes, filtered, and concentrated to 100 ml. and then diluted with 600 ml. of water. The semi-solid which separates is extracted with ether, dried and the ether is removed to give 2-hydroxy-2-nitromethyladamantane. To 0.63 mole of 2-nitromethyl-2-adamantanol dissolved in 250 ml. of acetic acid is added 20 grams of Raney nickel. The resultant solution is charged to an appropriately sized bomb and pressured to 60 p.s.i.g. hydrogen with cooling. The pressured reaction mixture is shaken until hydrogen uptake ceases and for two hours thereafter while maintaining the temperature below 35° C. The reaction mixture is discharged from the bomb and filtered to remove the catalyst. The resultant filtrate is concentrated at reduced pressure to about one-half volume. The concentrate containing 2-aminomethyl-2-adamantanol is suitable for use in the reaction of Example 4.

Example 4

To a well-stirred solution of 0.54 mole of 2-aminomethyl-2-adamantanol in 520 ml. of glacial acetic acid and 1040 ml. of water, there is added at 0° C. 1.24 moles of sodium nitrite dissolved in 174 ml. of water. The reaction mixture is stirred vigorously for 1 hour at 0° C. and allowed to come to room temperature with continued vigorous stirring. During this period, a white precipitate forms. The slurry is cooled to 0° C. and made basic (pH—9) by the addition of solid sodium hydroxide. The cold slurry is filtered and the collected solid is washed with water until the washes are neutral. The solid is steam distilled into hexane to give tricyclo(4.3.1.1$^{3,8}$)undecane-4-one, M.P. 258–260° C. (sealed tube). Molecular weight, calcd. 164.1201, found 164.1206 (by mass spec.).

I.R. $_{max}^{CH_2Cl_2}$ 3050, 1700, 1455, 1357, 1175, 1080 cm.$^{-1}$

*Analysis.*—Calcd. for $C_{11}H_{16}O$ (percent): C, 80.6; H, 9.7. Found (percent): C, 80.9; H, 9.7.

Example 5

To a solution of 0.05 mole of tricyclo(4.3.1.1$^{3,8}$)undecane-4-one in 40 ml. of ethanol is added 0.12 mole of hydroxylamine hydrochloride. The solution is heated at reflux for two hours. At the end of that period, the ethanol and pyridine are removed at reduced pressure. The residue is added to ice water. The solid precipitate is filtered, washed well with water, and dissolved in ether. The ether solution is dried with anhydrous magnesium sulfate. The ether solution is filtered and the ether removed at reduced pressure to give tricyclo(4.3.1.1$^{3,8}$)undecane-4-one oxime, which can be recrystallized from ether or pentane as a white solid.

To a solution of 0.04 mole of tricyclo(4.3.1.1$^{3,8}$)undecane-4-one oxime in 200 ml .of butanol heated at reflux in a nitrogen atmosphere, there is added over a two-hour period 0.26 g. atom of sodium cut into small pieces. At the end of this period, the solution is cooled and concentrated at reduced pressure in a nitrogen atmosphere. The residue is steam distilled into hexane in a nitrogen atmosphere. Anhydrous hydrogen chloride gas is passed into the hexane to precipitate the amine. The precipitate is filtered and recrystallized from 3 N hydrogen chloride solution to give 5 g. of tricyclo(4.3.1.1$^{3,8}$)undecane-4-amine hydrochloride, M.P. >300° C.

*Analysis.*—Calcd. for $C_{11}H_{19}N \cdot HCl$ (percent): C, 65.7; H, 9.4; N, 6.9; Cl, 17.7 Found (percent): C, 65.7; H, 9.9; N, 6.9; Cl, 17.1.

Example 6

To 500 ml. of glyme is added 0.28 mole of methyl triphenylphosphonium bromide and 0.25 mole of anhydrous potassium tertiary butoxide. The solution is warmed to 40° C. for two hours. During this period the solution becomes deep yellow. To this solution, at 30° C., is added 0.12 mole of tricyclo(4.3.1.1$^{3,8}$)undecane-4-one with vigorous stirring. The temperature is allowed to rise to 40° C. and the reaction is then stirred at room temperature for 24 hours. At the end of this period the reaction mixture is added to 3 liters of water and is then extracted with three 300-ml. portions pentane. The pentane extract is then concentrated at reduced pressure and the residual oil is steam distilled into hexane. The hexane solution is dried, filtered and concentrated to give 4-methylenetricyclo(4.3.1.1$^{3,8}$)undecane.

I.R.$_{max.}^{Neat}$ 3050, 2930, 1615, 1430, 1110, 890 875 cm.$^{-1}$

To 0.12 mole of 4-methylenetricyclo(4.3.1.1$^{3,8}$)undecane dissolved in 300 ml. of ether is added 100 ml. 1 N diborane solution in tetrahydrofuran. The solution is heated to 45° C. in nitrogen atmosphere for five hours. At the end of this period the solution is cooled to 0° C. To this cooled solution is added, cautiously, 30 ml. of 20% sodium hydroxide solution followed by the slow cautious addition at 0° C. of 30 ml. of 30% hydrogen peroxide solution. The reaction is allowed to come to room temperature and is stirred for an additional hour. At the end of this period a trace of platinum oxide is added to decompose the excess hydrogen peroxide and the mixture is stirred vigorously overnight. At the end of this period the organic layer is separated, 200 ml. of ether is added to the organic layer and the organic layer is washed until neutral with water. The ether solution is dried with anhydrous magnesium sulfate, filtered and the solvent is removed at reduced pressure to give a crystalline solid. The solid is recrystallized from hexane at —20° C. to give 4-hydroxymethyltricyclo(4.3.1.1$^{3,8}$)undecane, M.P. 61–62° C.

To 0.11 mole of 4-hydroxymethyltricyclo(4.3.1.1$^{3,8}$)undecane dissolved in 200 ml. of acetone at 10° C. is added 0.14 mole of standard chromium trioxide solution. The reaction mixture is stirred for 30 minutes. At the end of this period the reaction mixture is added to one liter of ether. The ether solution is extracted with water until the washes are no longer green. The ether-acetone solution is dried with anhydrous magnesium sulfate. The organic phase is filtered and then evaporated at reduced pressure. The residual solid is dissolved in warm 5% sodium hydroxide and extracted with ether. The aqueous phase is separated, warmed to 60° C. to remove excess ether, cooled and made strongly acidic with concentrated hydrochloric acid. The resulting precipitate is filtered and recrystallized from nitromethane to give tricyclo(4.3.1.1$^{3,8}$)undecane-4-carboxylic acid, M.P. 130–132° C.

To 0.1 mole of tricyclo(4.3.1.1$^{3,8}$) undecane-4-carboxylic acid is added 100 ml. of purified reagent grade thionyl chloride and two drops of dimethylformamide. The resulting solution is heated at reflux for one hour. At the end of that period the thionyl chloride is removed at reduced pressure and dry heptane is added to the residual oil. The heptane, in turn, is removed under reduced pressure. The residual oil is dissolved in ether and treated with anhydrous ammonia until the solution becomes strongly basic. The ether solution is washed with 5% sodium hydroxide, dried with anhydrous magnesium sulfate, filtered and evaporated under reduced pressure to give a pale yellow solid. The solid is recrystallized from nitromethane and then heptane to give tricyclo-(4.3.1.1$^{3,8}$)undecane-4-carboxamide, M.P. 159–161° C.

To 300 ml. of dry tetrahydrofuran is added 8 grams of lithium aluminum hydride in a nitrogen atmosphere. To the stirred mixture is added 0.05 mole of tricyclo-(4.3.1.1$^{3,8}$)undecane-4-carboxamide dissolved in 150 ml. of anhydrous tetrahydrofuran over a one-hour period. The resulting mixture is heated and stirred in a nitrogen atmosphere for 24 hours. At the end of this period the mixture is neutralized by the cautious addition, at 0° C., of 20% sodium hydroxide solution until all the salts precipitate. The tetrahydrofuran solution is decanted and then evaporated at reduced pressure. The residual oil is steam distilled in a nitrogen atmosphere into hexane. The hexane solution is dried with anhydrous potassium carbonate and filtered. To the dried solution is added anhydrous hydrogen chloride to precipitate 4-aminomethyl - tricyclo(4.3.1.1$^{3,8}$)undecane hydrochloride, M.P.>300° C.

I claim:
1. Tricyclo[4.3.1.1$^{3,8}$]undecane-4-one.

References Cited

Geluk et al., Chemical Communications, p. 426 (1967).
Chemical Abstr., vol. 58, column 13811(d) (1963).

LEON ZITVER, Primary Examiner

G. A. SCHWARTZ, Assistant Examiner

U.S. Cl. X.R.

260—563 P, 570.5 R, 570.5 CA, 999